UNITED STATES PATENT OFFICE.

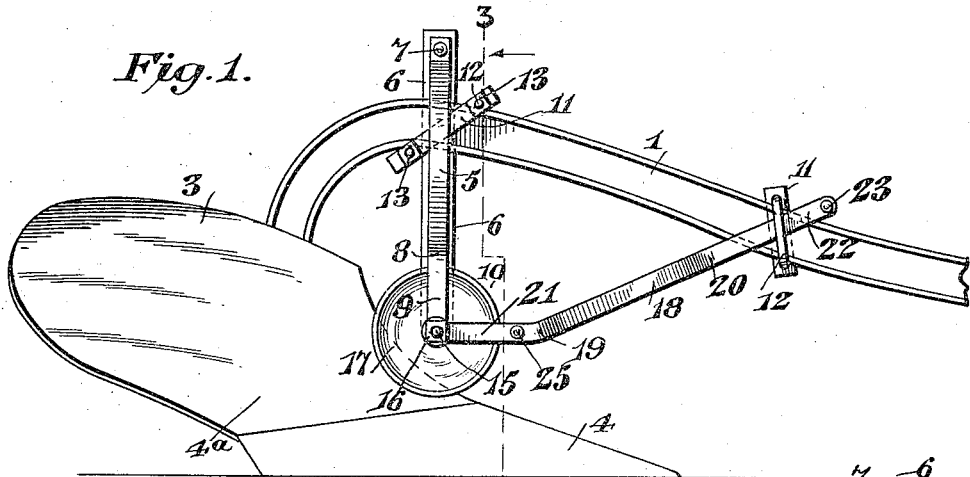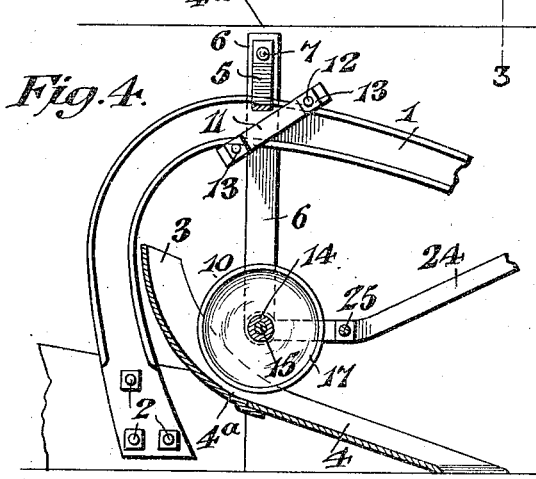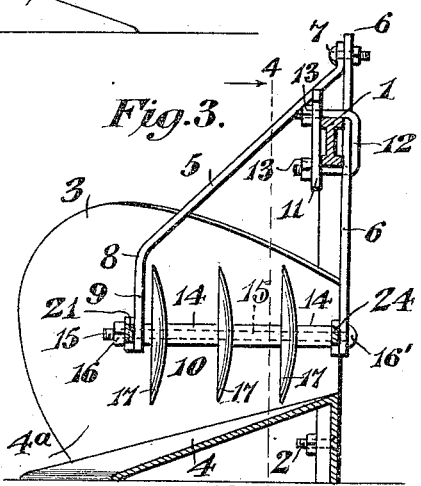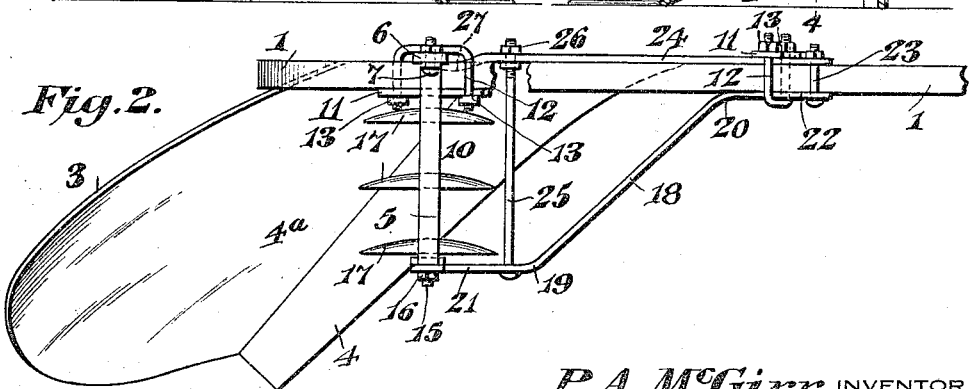

PATRICK A. McGIRR, OF DE KALB, ILLINOIS.

PLOW.

1,297,377.  Specification of Letters Patent.  Patented Mar. 18, 1919.

Application filed April 24, 1918. Serial No. 230,517.

*To all whom it may concern:*

Be it known that I, PATRICK A. McGIRR, a citizen of the United States, residing at DeKalb, in the county of Dekalb and State of Illinois, have invented a new and useful Plow, of which the following is a specification.

My invention relates to plows and particularly to a sod and stubble cutting attachment for plows.

A principal object of this invention is to provide an attachment for plows which will cut the sod or stubble immediately after the plow has turned the slice of soil, or to be more accurate, before the plow has completely turned over the slice. In other words, it is my object to provide a cutting attachment which will function while the plow is still functioning, i. e. which will slice the sod as it falls away from the moldboard after being turned thereby.

Another object is to provide a plow attachment which will help to pulverize the soil, thereby saving further harrowing.

Other objects of this invention are to provide a simple attachment, one which is easily adjusted for various soil conditions, and one which is strong and durable.

One embodiment of this invention is illustrated in the drawing which accompanies and forms a part of this specification. I desire it to be understood, however, that I contemplate making changes in many details in carrying out my invention, and that I do not wish to be limited to a strict adherence to the illustrated embodiment except by the appended claims.

In the drawing—

Figure 1 is a side elevation of a plow equipped with my attachment;

Fig. 2 is a top plan view of the same.

Fig. 3 is a vertical sectional view taken on the line 3—3 of Fig. 1 and looking in the direction of the arrow; and Fig. 4 is a vertical sectional view on the line 4—4 of Fig. 3, looking in the direction of the arrow, parts of the plow being broken away.

Referring to the drawing, it will be seen that the numeral 1 designates a beam of a plow, the foot or standard of which is held by bolts 2 to the plow 3. 4 is the share or point of the plow, while 4ª is the moldboard of the same. The parts so far described are those of a plow of ordinary construction and form no part of my invention.

The sod and stubble cutting attachment comprises the bent hanger 5 and the straight hanger 6 connected together by a bolt as at 7 and passing one on either side of the beam 1, as Fig. 3 clearly shows. The hanger 5 is bent as at 8 at an angle approximating 45°, forming the part 9 which is vertical and parallel to the straight hanger 6. These hangers support the cutting means, indicated generally by the numeral 10 and are in turn supported upon the beam 1 by means of a U-shaped clip or clamp. Said clip consists of the U-shaped bracket 12 and the strap 11, which is threaded near each end to receive the two ends of the bracket. Nuts 13 unite the strap and bracket. As shown, the clip passes around the vertical hanger 6 and clamps it tightly against the plow beam, thus holding the sod-cutting means at the desired elevation. Loosening the nuts 13 will allow the clip to be moved along the beam. Hence it is obvious that the hangers 5 and 6 may be held at any angle and need not be maintained in a position in the vertical plane.

The cutting means above referred to consists of a sleeve 14 mounted on a rod 15 which is supported by the lower ends of the hangers 5 and 6. The landside end of the rod 15 has a head 16', while the furrow side is provided with a nut 16. The sleeve 14 carries a plurality of disks 17, preferably three in number, which rotate as a unit, but four or two may be more desirable under certain conditions. These disks are similar to those found in the common types of disk harrows and need no further description. The sleeve 14 is free to rotate about its bearing rod 15 and may be removed and replaced by another sleeve of similar construction but bearing other sizes, styles or arrangements of disks. Such a removal is effected by loosening nut 16.

As Fig. 3 shows, the hangers 5 and 6 with the rod 15, form a substantially triangular or bow-shaped frame. A second and somewhat similar frame is also mounted on the beam, said frame including the bars 18 and 24, which are secured at one end by a clip to the beam as will be described, and at the other end to the rod 15. The bar 18 is bent at an angle of 45° at 20 to form the part 22, which engages with the plow beam. This bar is also bent in two planes at 19, as Figs. 1 and 2 indicate. Thus bar 18 rises from the part 21 and also turns toward the beam from that part. The part 21 is held by nut 16 while the part 22 is joined to the bar 24 by bolt 23 which passes over the plow beam. A bracing rod 25 is passed through the part 21 near the bend 19 and also through the bar 24, to which it is held by the nuts 26 one on each side of the bar. This bracing rod 25 adds strength and rigidity to the frame formed by the parts 18, 24, and 15, but does not in any way interfere with the slicing action of the disks.

A U-shaped clip similar in every respect to the clip which clamps the hanger 6 to the beam, and similarly designated, holds the part 22 of the bar 18 firmly against the beam so that the former can suffer no displacement. The bar 24 is bent as at 27 between its point of connection with the bracing rod 25 and its connection with the rod 15. In every respect the bar 24 bears the relation to bar 18 that hanger 6 bears to hanger 5. In Fig. 1 bar 18 hides bar 24 because 24 appears the same in elevation as bar 18. However, as the drawing shows, bar 24 lies almost entirely in two planes, whereas 18 lies in three planes.

It will be noticed that the two frames above described, are both connected to the cutting means proper and are both slidably connected to the beam. Hence by merely loosening the nuts 13 of each clip the cutting mechanism can be raised or lowered or shifted laterally at the will of the user.

The disks 17 act as rotating knives. The furrow is cut by the share 4 and delivered against the moldboard 4ᵃ and the latter throws it upward and turns it over. However, while the furrow is being turned, the disks 17 get in their work. If sod is being plowed, the sod will be sliced into strips, and only the soddy part of the furrow will be so cut. If stalks or stubble are on the ground, these will be cut up. The disks do not slice the soil preparatory to the plowing, but they slice the soil after the share or point has done its work. This invention therefore, is not a device which will increase materially the draft of the plow as any attachment inevitably does which slices the hard ground before the share cuts the furrow. The present invention lets the plowshare do its work first and then catches the furrow just as it breaks and cuts the sod or stubble. In order to attain this result, the disks 17 are shaped so as to conform generally to the face of the moldboard as Fig. 4 shows. In short, the disks are so shaped that they coöperate with the moldboard to turn the furrow while slicing it at the same time. I prefer to place these disks about two inches from the face of the moldboard, but under certain conditions, they might be placed even closer or slightly farther away to advantage. The essential point is that the disks be close to the moldboard and above the share, as Fig. 4 best indicates. My invention resides mainly in this disposition of the cutting blades, and it is this arrangement which I desire to protect.

This attachment is considered to be a great aid to a farmer, especially when breaking new land. Ordinarily, after a field is plowed or even cross-plowed, considerable harrowing must be resorted to before the land is in fit condition for crops. My invention lessens the time and labor necessary for preparing a field for cultivation without materially increasing the draft.

What is claimed is—

1. The combination of a plow, a series of cutters arranged closely adjacent to the moldboard of the plow, and above the share, said cutters being spaced to cut the furrow in slices as the furrow falls away from the moldboard after being turned thereby, and means for holding the cutters in a fixed position with relation to the moldboard.

2. The combination of a plow, a series of rotatable cutters arranged closely adjacent to the face of the moldboard of the plow and above and back of the point of the plow, and spaced from the landside edges of the plow, said cutters being spaced to cut the furrow in slices as it falls away from the moldboard after being turned thereby, and means for holding the cutters in a fixed position relative to the moldboard.

3. The combination of a plow, a series of rotatable disk-like cutters, rotatable as a unit and spaced apart so as to cut the furrow in slices after the share has cut the furrow and while the furrow falls away from the moldboard, and adjustable means holding the cutters in the desired position relative to the moldboard.

4. The combination of a plow, a series of rotatable cutters, said cutters being in the form of disks having concaved faces, said faces being turned toward the furrow side of the plow, the curvature of the peripheries of the cutters conforming to the curvature of the moldboard, said cutters being adapted to coöperate with the moldboard to turn the furrow over and at the same time, to cut the furrow as it falls away from the moldboard, and means adjustably holding the cutters to the plow beam.

In testimony that I claim the foregoing as my own I have hereto affixed my signature in the presence of two witnesses.

PATRICK A. McGIRR.

Witnesses:
 Wm. P. Ballou,
 Geo. W. Rowe.